United States Patent [19]

Glantz

[11] 4,420,494
[45] Dec. 13, 1983

[54] PROCESS FOR MAKING SKIN-ON POTATO BOATS

[75] Inventor: Jerome J. Glantz, Tualatin, Oreg.

[73] Assignee: Lamb-Weston, Inc., Portland, Oreg.

[21] Appl. No.: 409,870

[22] Filed: Aug. 20, 1982

Related U.S. Application Data

[63] Continuation-in-part of Ser. No. 380,066, May 20, 1982, abandoned.

[51] Int. Cl.³ .............................................. A23L 1/216
[52] U.S. Cl. .................................... 426/441; 426/481; 426/514; 426/637; 426/808
[58] Field of Search .............. 426/104, 637, 438, 441, 426/481, 482, 483, 506, 514, 520, 808, 524, 279, 280

[56] References Cited

U.S. PATENT DOCUMENTS

| | | | |
|---|---|---|---|
| 1,025,373 | 5/1912 | Cooke | 426/637 |
| 2,056,884 | 10/1936 | Brunstetter | |
| 2,441,305 | 5/1948 | Wilson | |
| 3,057,732 | 10/1962 | Conrad et al. | |
| 3,743,512 | 7/1973 | Hansen et al. | |
| 3,862,345 | 1/1975 | Westover et al. | 426/483 X |
| 3,870,809 | 3/1975 | Green et al. | 426/482 X |
| 3,937,850 | 2/1976 | Farha et al. | 426/481 X |
| 3,949,096 | 4/1976 | Johnson et al. | 426/302 |
| 4,167,588 | 9/1979 | Willard | 426/637 X |
| 4,186,216 | 1/1980 | Roth | 426/524 X |
| 4,246,293 | 1/1981 | Carson | 426/637 |
| 4,256,777 | 3/1981 | Weaver et al. | 426/637 |
| 4,277,510 | 7/1981 | Wicklund et al. | 426/637 X |
| 4,298,627 | 11/1981 | Rains | 426/637 |

*Primary Examiner*—Arthur L. Corbin
*Attorney, Agent, or Firm*—Klarquist, Sparkman, Campbell, Leigh & Whinston

[57] ABSTRACT

A method for making skin-on potato boats includes blanching whole potatoes to gelatinize the outer layer beneath the skin, cutting the potatoes in half to expose cut surfaces and in one embodiment abrading away the ungelatinized center portion of the potato halves. In a second embodiment, the center portions are manually removed with a scraping device. In either embodiment, the resulting hollowed-out potato halves may then be blanched, air cooled, parfried and frozen for later reconstitution. After parfrying, the potato boats have a solids content of about 35%-45%. Upon reconstitution the potato boats may be filled with condiments, such as cheese and the like, and served as so-called "potato skins."

29 Claims, 6 Drawing Figures

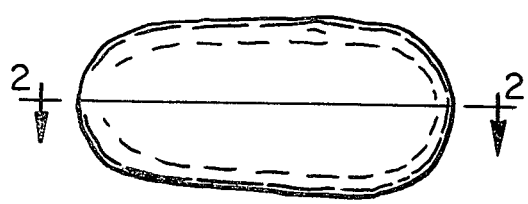
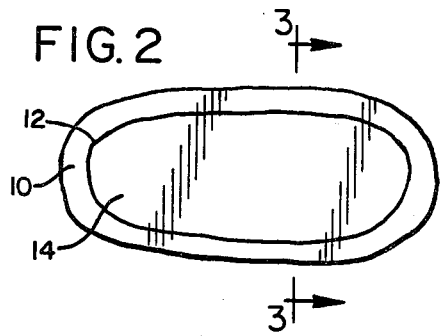
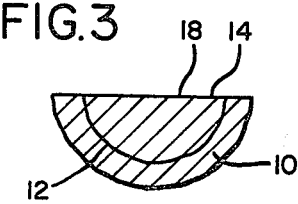
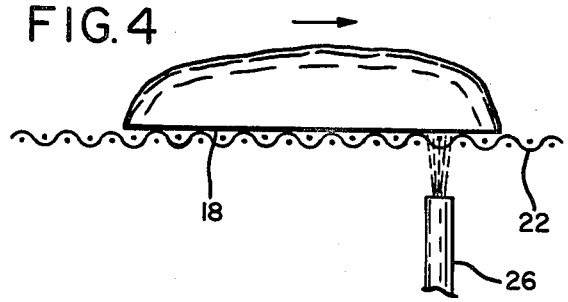
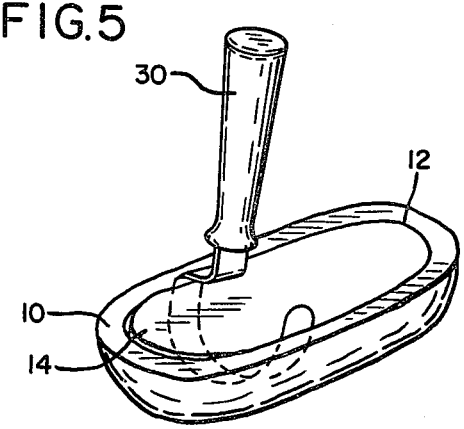
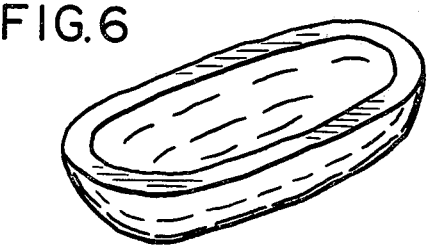

PROCESS FOR MAKING SKIN-ON POTATO BOATS

This application is a continuation-in-part of application Ser. No. 380,066, filed May 20, 1982, now abandoned.

The present invention reltes generally to potato processing and more particularly to a method for preparing skin-on "potato boats," which are hollowed out potato halves used in making so-called "potato skins."

BACKGROUND OF THE INVENTION

The serving of "potato skins" has been steadily increasing in restaurants and other eating establishments. Potato skins are formed from hollowed-out potato halves or "potato boats" which typically are fried in hot oil and filled with condiments, such as cheese and the like.

Such potato boats traditionally have been prepared at the restaurant by baking and thereby partially cooking whole potatoes, slicing the potatoes in half, scooping out the center portions of the potato halves and then oil frying and/or broiling them. Similarly, potato boats have been prepared commercially for shipment to restaurants and the like by baking and thereby partially cooking whole potatoes, slicing the potatoes in half, manually or mechanically scooping out the center portions of the potato halves, and then freezing them.

Such processes are unsatisfactory for several reasons. First, they tend to produce a nonuniform product having a variable thickness. As a result, uneven cooking may occur from one potato boat to the next and even within a single potato boat. A potato boat or portion thereof that is too "thin" will overcook and have a texture which is too hard for desirable consumption. Conversely, a potato boat or portion thereof that is too "thick" will undercook and have a texture which is too soft.

Second, a nonuniform product makes it difficult accurately to control the yield of the product, that is, the amount of potato product relative to the quantity of the condiments added. A potato boat which is too thick tastes too much like a baked potato, while a potato boat which is too thin lacks the desired consistency.

Third, the product when fried in oil is "heavy" and has a high oil perception, giving it a greasy taste. Moreover, the product tends to be flaky and prone to making the frying oil "dirty."

Fourth, the step of scooping out the center portions of the potato halves is time-consuming, and hence is undesirable for efficient, inexpensive production of potato boats in large quantities.

Finally, the center portions removed from the baked potato halves are in a soft, cooked form, and hence have little value aside from their use as a mashed potato product.

Accordingly, there is a need for a process for making skin-on potato boats having a relatively uniform shell thickness and improved product characteristics.

It is therefore one object of the invention to provide a process for preparing potato boats having a relatively uniform shell thickness.

Another object of the invention is to provide a process as aforesaid which is more efficient from a production standpoint.

A further object of the invention is to provide a process as aforesaid that promotes even cooking of the product, as well as a high degree of yield control.

Yet another object of the invention is to provide a process as aforesaid that is particularly adapted for automated production of potato boats in large quantities.

Still another object of the invention is to provide a process as aforesaid that produces potato boats having improved product characteristics.

Another object of the invention is to provide a process as aforesaid in which the removed center portions constitute a valuable by-product suitable for use in a wide variety of potato products, including "french fries."

Other objects and advantages of the invention will become apparent from the following detailed description.

SUMMARY OF THE INVENTION

In accordance with the foregoing objects, the present invention comprises a process for preparing skin-on potato boats having a uniform shell thickness and a firm, palatable texture. Whole potatoes are blanched to gelatinize an outer layer of desired thickness beneath the skin of the potato and thereafter sliced in half to form potato halves having exposed cut surfaces. A perceptible ring formed during blanching distinguishes the gelatinized outer layer from the ungelatinized center portion. In one embodiment of the process, the ungelatinized center portions of the potato halves are next abraded away by impinging an abrading means upon the cut surfaces. The abrading means may comprise a stream of abrasive particles such as, for example, starch particles. In a second embodiment, the center portions are manually scooped out using the ring as a guideline. In both embodiments, the hollowed-out potato halves are then preferably blanched, air cooled, parfried in oil and frozen such that they have a solids content of about 35%-45% by weight. The frozen potato boats are conventionally reconstituted, such as by broiling, baking and/or frying in oil.

BRIEF DESCRIPTION OF THE DRAWINGS

In the drawings:

FIG. 1 is a front elevational view of a whole potato after it has been blanched and sliced lengthwise along its major diameter.

FIG. 2 is a plan view of a potato half taken along line 2—2 of FIG. 1, showing a perceptible ring distinguishing the outer gelatinized layer formed during blanching from the ungelatinized center portion.

FIG. 3 is a vertical section taken along line 3—3 of FIG. 2.

FIG. 4 is a front elevational view of one embodiment of the invention showing a potato half being passed on a conveyor screen over a blasting jet.

FIG. 5 is a perspective view of a second embodiment illustrating the removal of the ungelatinized center portion with a scraping device.

FIG. 6 is a perspective view of a potato half after the ungelatinized center portion has been removed, either by manual scooping or blasting.

DETAILED DESCRIPTION OF A PREFERRED EMBODIMENT

In accordance with the present invention, potatoes are held in storage under conventional accepted conditions, so as not to accumulate excessive amounts of sugar therein. Potatoes of the Russet Burbank variety weighing 4 to 8 ounces and having a length of 3 to 4½ inches and a diameter of 1¾ to 2¾ inches are preferred. The potatoes are cleaned using a water spray or some other technique well known in the art.

The potatoes are inspected whereby defective and misshaped potatoes are removed. The peels of the potatoes are pierced with about 60-80 small holes to prevent puffing during later processing.

The potatoes are then blanched to kill enzymes present therein and, as illustrated by FIGS. 2 and 3, to gelatinize a ⅛-½ inch outer layer or "heat ring" 10 beneath the skin. It has been found that a ¼ inch heat ring works well. The heat ring 10 is translucent and hence is visually distinguishable from the white, opaque ungelatinized center portion 14. The potatoes preferably are blanched in water at a temperature ranging from about 170° F. to 210° F. for about 3-15 minutes. It has been found that blanching at about 190° F. for about 7 minutes works well. After blanching, the ungelatinized center portion of each potato constitutes about 25%-75% of the potato by weight depending upon the thickness of the heat ring. For example, the center portion of a potato having a ¼ inch heat ring would constitute about 45%-52% of the potato by weight.

The blanched potatoes are cut in half lengthwise along their major diameter to form potato halves having cut surface portions 18 (FIG. 3).

Embodiment of FIG. 4

In one embodiment of the process, the cut surface portions 18 are then subjected to impingement by a stream of grit-like particles, as, for example, raw potato starch particles, carried in air. This may be accomplished by passing the potato halves on a screen conveyor 22 over one or more blasting jets 26, as illustrated in FIG. 4. The impingement of the starch particles abrades away the ungelatinized center portions 14 of the potato halves, leaving intact the heat rings 10.

During the impingement process, a stream flow rate of about 100 CFM is preferred, although any flow rate sufficient to abrade away the ungelatinized potato cells will work. It is believed that the ungelatinized center portions are effectively removed because the ungelatinized potato cells shatter when impinged by the potato starch particles. The gelatinized potato cells forming the outer heat ring do not abrade away because they are more elastic and not prone to shattering.

A grit or flail may also be used as the impinging material, but the use of potato starch is advantageous inasmuch as it is a non-foreign material and readily recyclable. Other impinging materials, such as potato flour and crushed bulgur wheat, may also be used. A medium other than air may also be used to carry the abrasive material. Surface starch, grit or flail remaining on the potato halves after blasting is rinsed off with a water spray. Such starch may be recycled as an abrasive or used in other food products.

After rinsing, the hollowed-out potato halves, such as the one shown in FIG. 6, are inspected and those with excessive defects or undesirable cavities are removed. Such potato halves may be frozen at this time for storage and/or transportation, but preferably are processed further as provided below.

The hollowed-out potato halves may be blanched again so as to remove any high sugars that may have developed during storage and to gelatinize any starch not converted on the initial blanching of the whole potatoes. Such blanching may be at a temperature ranging from about 150° F. to about 210° F. and for about 2-10 minutes. It has been found that blanching at about 190° F. for about 5 minutes works well.

The blanched potato halves are next air cooled at ambient temperature for about 2-10 minutes to stop the blanching action and, if necessary, to remove some of the moisture from the product and facilitate retrograding of the starch. Air cooling the potato halves at any temperature below 150° F. will stop the blanching, but cooling at about 70° F. for about 5 minutes is preferred. The potato halves may be cooled with a water spray or bath instead of air.

The cooled potato halves are then parfried in hot oil at a temperature ranging from about 325° F. to 400° F. for about ½-10 minutes—preferably at about 375° F. for about 5 minutes.

If prepared according to the foregoing parameters, the processed potato halves or potato boats will have a solids content of about 35% to 45%, including about 4%-7% oils, by weight, with "thinner" potato boats tending to fall into the higher end of both ranges and the "thicker" products into the lower end. They are firm, hold their shape and have a palatable texture for consumption. For purposes of storage and/or shipment they may be frozen at a temperature ranging from about −30° F. to −10° F. for about 15-30 minutes, and preferably at about <20° F. for about 20 minutes.

The frozen potato boats may be reconstituted by frying them in oil at a temperature of about 360° F. for about 3 minutes, or by other conventional methods, such as broiling or baking. They may also be reconstituted in a microwave oven, but in that event, they should be processed by a longer parfrying so that their solids content, when frozen, is greater than the 35% to 45% range.

Embodiment of FIG. 5

In a second embodiment of the process, the potatoes are processed exactly as set forth above, except that the ungelatinized center portion 14 is manually scooped out with a scraping or cutting device 30, as shown in FIG. 5, rather than being subjected to a stream of starch particles. The ring 12 provides a distinct visual guideline demarking the outer heat ring from the ungelatinized center portion, thereby enabling the scraper to produce a product having a markedly uniform product thickness in comparison to prior manually and mechanically scooped products.

Because the uncooked center portion is relatively hard, a substantial portion thereof suitable for a wide variety of uses may be removed in a single piece. A few touch-up passes with the scraping device to remove small fragments of the uncooked center portion adjacent ring 14 may be necessary.

EXAMPLE I

Russet-type potatoes having a length of about 3¾ inches and a major diameter of about 2½ inches were washed, pierced and blanched at a temperature of about 190° F. for about 7 minutes. The potatoes were sliced in half lengthwise along their major diameter, exposing cut surfaces. Such cut surfaces were then subjected to a stream of starch particles carried in air.

A standard blasting gun or jet was used. It had a No. 6 (6/16 inch) nozzle opening positioned about 3 inches away from the cut surfaces and a No. 7 (7/32 inch)

orifice. A stream flow rate of about 100 CFM at about 120 psi was utilized. A standard mixture of starch granules ranging in size from 10 to 100 microns was drawn into the air stream through a venturi located between the orifice and nozzle. The stream removed the ungelatinized center portions of the potato halves, leaving the outer heat rings intact.

The resulting hollowed-out potato halves were rinsed with a water spray and blanched at a temperature of about 190° F. for about 5 minutes. They were then cooled at ambient temperature for about 5 minutes. Thereafter, they were parfried at a temperature of about 375° F. for about 5 minutes and subsequently frozen. The frozen potato halves were reconstituted by frying them in oil at a temperature of about 360° F. for about 3 minutes.

The resulting potato boats had crisp surfaces, mealy potato interiors, low oil perception and golden coloration. They had an average solids content of about 43%, including about 6% oils.

EXAMPLE II

Russet-type potatoes having a length predominantly between 3 and 4½ inches (average of about 3¾ inches) and a major diameter predominantly between 1¾ and 2¾ inches (average of about 2⅛ inches) were washed and blanched at a temperature of about 190° for about 7 minutes. The potatoes were sliced in half lengthwise along their major diameter, exposing cut surfaces.

The center portions were manually removed with a scraping device, using the ring as a visual guideline. The resulting hollowed-out potato halves were blanched at a temperature of about 190° F. for about 5 minutes, and then water cooled at about 70° F. for about 5 minutes. Thereafter they were parfried at a temperature of about 375° F. for about 5 minutes and subsequently frozen.

The resulting potato boats after reconstitution had crisp surfaces, mealy potato interiors, low oil perception and uniformly golden coloration. They were slightly thicker than the products of the previous example and had an average solids content of about 38%, including about 4.6% oils.

It will be apparent to those skilled in the art that the gelatinized layer or heat ring formed during the initial blanching of a potato has a uniform thickness throughout. Thus, after such potato is cut in half and the ungelatinized center portion removed by the impinging particle stream, the resulting potato boat has a uniform thickness throughout. Moreover, all potato boats blanched at the same time and temperature parameters have the same thickness, regardless of variations in size. As a result of such uniformity in the product, it will be appreciated that it is easy to evenly cook and maintain high yield control during the product's preparation. Furthermore, the thickness of the product can be easily varied simply by modifying the initial blanching parameters. For example, the thickness can be increased by prolonging the initial blanching period and decreased by reducing such period.

The manual scooping embodiment does not achieve a product with quite the same degree of uniformity of thickness as the impinging particle embodiment. However, the presence of a visual guideline distinctly defining the portion of potato half to be removed enables the scraper to produce a product of relatively uniform thickness and one which achieves the advantages associated with a uniform thickness to a large extent.

The impinging particle embodiment enables potato boats to be produced efficiently and inexpensively in large quantities through the use of automated conveyors, blasting jets and potato handling equipment, and therefore with only a minimal amount of manual labor.

The manual scooping embodiment is advantageous in that the uncooked center portion is removed substantially in a single piece. Thus, such center portion is a valuable by-product suitable for a wide variety of uses and further processing.

Both embodiments produce a product having markedly improved oil perception, texture, taste and coloration in comparison to prior products. Such improvement is due primarily to processing the product in a specified manner and with defined temperature and time parameters. For example, during processing the surface of the product becomes sealed, containing the desired percentage of oil by weight. Thus, unlike prior products, very little oil is absorbed into the product during the oil fry reconstitution. Additionally, the product has a smooth, nonflaky texture. Thus, upon reconstitution there is little tendency of the product to dirty the frying oil.

Those skilled in the art will appreciate that some deviation from the above procedure, including elimination of some of the steps, will still result in a satisfactory product. For example, the product need not be frozen if it is being prepared for immediate consumption. As a further example, both a mechanical scraping device and the impinging starch particles may be used to hollow-out a potato half after blanching, the scraping device being used initially to remove the innermost segment of the gelatinized portion and the starch particles being used to remove the gelatinized portion closest to the heat ring. In this way, the amount of energy used during the starch-impinging step is minimized. Similarly, the described method can be used to make "open shell" potato boats, that is, hollowed out potato boats that have been cut in half or in thirds, or whole potatoes that have been sliced in, for example, thirds or fourths and the center portions removed.

Having illustrated and described the principles of my invention by what is presently a preferred embodiment and several suggested alternatives, it should be apparent to those persons skilled in the art that such embodiments may be modified in arrangement and detail without departing from such principles. I claim as my invention all such modifications as come within the true spirit and scope of the invention as defined by the following claims.

I claim:

1. A method of preparing a potato boat comprising the steps of:

blanching a whole potato under conditions and for a period of time sufficient to gelatinize the outer layer of the potato to a desired thickness, thereby leaving an ungelatinized center portion;

slicing the potato into sections to form a potato section having an exposed cut surface containing a gelatinized outer layer and an ungelatinized center portion; and impinging an abrading means upon the exposed cut surface of the potato section to remove the ungelatinized portion of the potato section while leaving the gelatinized outer layer of the potato section substantially intact.

2. The method of claim 1 further comprising piercing the outer peel of the potato prior to blanching.

3. The method of claim 1 further comprising freezing the potato section subsequent to impinging.

4. The method of claim 1 further comprising removing a portion of the ungelatinized center portion, from the potato section, with a scraping device prior to impinging the abrading means upon the potato section which thereby removes the remainder of the ungelatinized center portion.

5. The method of claim 1 wherein the potato is blanched at a temperature within the range of about 170° F.–210° F. for about 3 to 15 minutes.

6. The method of claim 1 wherein the potato is blanched to form an outer gelatinized layer of about ⅛–178 inch, the ungelatinized center portion constituting about 25% to about 75% of the potato by weight.

7. The method of claim 1 wherein the exposed cut surface of the potato section is impinged with starch particles carried in air.

8. The method of claim 1 further comprising parfrying and freezing the potato section subsequent to impinging.

9. The method of claim 8 wherein the potato section is parfried at a temperature range of about 325° F.–400° F. for about ½ to 10 minutes and frozen at a temperature range of about −30° F. to −10° F. for about 15 to 30 minutes.

10. The method of claim 1 further comprising blanching the potato section subsequent to impinging.

11. The method of claim 10 wherein the potato section is blanched subsequent to impinging at a temperature within the range of 150° F.–210° F. for about 2 to 10 minutes.

12. The method of claim 10 further comprising air cooling the potato section, subsequent to the latter blanching, at a temperature of about 70° F. for about 2 to 10 minutes.

13. A method of preparing a potato boat comprising the steps of:
 blanching a whole potato under conditions and for a period of time sufficient to gelatinize the outer layer of the potato to a desired thickness, thereby leaving an ungelatinized center portion;
 slicing the potato in half to form a potato half having an exposed cut surface containing a gelatinized outer layer and an ungelatinized center portion;
 exposing such surface to a stream of starch particles carried in air to remove the ungelatinized center portion of the potato half while leaving said gelatinized outer layer substantially intact;
 parfrying the potato half such that its total solids content is about 35%–45% by weight; and then
 freezing the potato half.

14. The method of claim 13 further comprising reconstituting the frozen potato half by frying it in oil at a temperature of about 360° F. for about 3 minutes.

15. A method of preparing a skin-on potato boat comprising the steps of:
 blanching a whole potato for about 3 to 15 minutes at a temperature from about 170° F. to about 210° F. to gelatinize the outer layer of the potato to a desired thickness, thereby leaving an ungelatinized center portion;
 slicing the potato lengthwise along its major diameter to form a potato half having an exposed cut surface containing a gelatinized outer layer and an ungelatinized center portion;
 exposing such surface to a stream of starch particles carried in air substantially to abrade away the ungelatinized center portion of the potato half while leaving said gelatinized outer layer substantially intact;
 blanching the potato half for about 2 minutes to about 10 minutes at a temperature from about 150° F. to about 210° F.;
 cooling the potato half in air for about 2 minutes to about 10 minutes at a temperature of about 70° F.;
 parfrying the potato half for about ½ minute to about 10 minutes at a temperature from about 325° F. to about 400° F.; and then
 freezing the potato half by exposing it to air for about 15 to about 30 minutes at a temperature from about −30° F. to about −10° F.

16. A method of preparing a skin-on potato boat comprising the steps of:
 blanching a whole potato under conditions and for a period of time sufficient to gelatinize the outer layer of the potato to a desired thickness, thereby leaving an ungelatinized center portion;
 slicing the potato in half to form a potato half having an exposed cut surface containing an ungelatinized center portion and a gelatinized outer layer; and
 abrading away the ungelatinized center portion of the potato half while leaving said gelatinized outer layer substantially intact to form a cavity suitable for holding condiments.

17. A method of preparing a potato boat comprising the steps of:
 blanching a whole potato under conditions and for a period of time sufficient to gelatinize the outer layer of the potato to a desired thickness, thereby leaving an ungelatinized center portion;
 slicing the potato into sections to form a potato section having an exposed cut surface containing a gelatinized outer layer and an ungelatinized center portion; and
 removing the ungelatinized center portion of the potato section while leaving the gelatinized outer layer of the potato section substantially intact.

18. A method of preparing a potato boat comprising the steps of:
 blanching a whole potato under conditions and for a period of time sufficient to gelatinize the outer layer of the potato to a desired thickness, thereby leaving an ungelatinized center portion;
 slicing the potato into at least two sections to expose a cut surface on each section containing a gelatinized outer layer and an ungelatinized center portion; and
 scooping out the ungelatinized center portion of a potato section while leaving the gelatinized outer layer of said potato section substantially intact.

19. The method of claim 18 further comprising freezing the scooped out potato section.

20. The method of claim 18 wherein the potato is blanched at a temperature within the range of about 170° F.–210° F. for about 3 to 15 minutes.

21. The method of claim 18 wherein the potato is blanched to form an outer gelatinized layer of about ⅛–178 inch, the ungelatinized center portion constituting about 25% to about 75% of the potato by weight.

22. The method of claim 18 further comprising parfrying and freezing the scooped out potato section.

23. The method of claim 22 wherein the potato section is parfried at a temperature range of about 325° F.–400° F. for about ½ to 10 minutes and frozen at a temperature range of about −30° F. to −10° F. for about 15 to 30 minutes.

24. The method of claim 18 further comprising blanching the scooped out potato section.

25. The method of claim 24 wherein the scooped out potato section is blanched at a temperature within the range of 150° F.–210° F. for about 2 to 10 minutes.

26. The method of claim 24 further comprising water cooling the potato section, subsequent to the latter blanching, at a temperature of about 70° F. for about 2 to 10 minutes.

27. A method of preparing a potato boat comprising the steps of:
 blanching a whole potato under conditions and for a period of time sufficient to gelatinize the outer layer of the potato to a desired thickness, thereby leaving an ungelatinized center portion;
 slicing the potato in half to form a potato half having an exposed cut surface containing a gelatinized outer layer and an ungelatinized center portion;
 removing the ungelatinized center portion of the potato half while leaving the gelatinized outer layer intact;
 parfrying the potato half such that its total solids content is about 35%–45% by weight; and then
 freezing the potato half.

28. The method of claim 27 further comprising reconstituting the frozen potato half by frying it in oil at a temperature of about 360° F. for about 3 minutes.

29. A method of preparing a skin-on potato boat comprising the steps of:
 blanching a whole potato for about 3 to 15 minutes at a temperature from about 170° F. to about 210° F. to gelatinize the outer layer of the potato to a desired thickness, thereby leaving an ungelatinized center portion;
 slicing the potato lengthwise along its major diameter to form a potato half having an exposed cut surface containing a gelatinized outer layer and an ungelatinized center portion;
 manually scooping out the ungelatinized center portion of the potato half while leaving the gelatinized outer layer of the potato half substantially intact;
 blanching the potato half for about 2 minutes to about 10 minutes at a temperature from about 150° F. to about 210° F.;
 cooling the potato half for about 2 minutes to about 10 minutes at a temperature of about 70° F.;
 parfrying the potato half for about ½ minute to about 10 minutes at a temperature from about 325° F. to about 400° F.; and then
 freezing the potato half by exposing it to air for about 15 to about 30 minutes at a temperature from about −30° F. to about −10° F.

* * * * *

UNITED STATES PATENT AND TRADEMARK OFFICE
CERTIFICATE OF CORRECTION

PATENT NO. : 4,420,494
DATED : December 13, 1983
INVENTOR(S) : JEROME J. GLANTZ

It is certified that error appears in the above-identified patent and that said Letters Patent are hereby corrected as shown below:

Column 1, line 8: "reltes" should be --relates--;
Column 4, line 29: "<20°F" should be -- -20°F --;
Column 7, line 14: "1/8-178" should be -- 1/8-1/2 --; and
Column 8, Line 62: "1/8-178" should be -- 1/8-1/2 --.

Signed and Sealed this

Third Day of April 1984

[SEAL]

Attest:

GERALD J. MOSSINGHOFF

Attesting Officer   Commissioner of Patents and Trademarks